(12) United States Patent
Elgarousha

(10) Patent No.: US 9,145,873 B1
(45) Date of Patent: Sep. 29, 2015

(54) GEOTHERMAL ENERGY GENERATOR SYSTEM

(71) Applicant: Nahed A. Elgarousha, Jeddah (SA)

(72) Inventor: Nahed A. Elgarousha, Jeddah (SA)

( * ) Notice: Subject to any disclaimer, the term of this patent is extended or adjusted under 35 U.S.C. 154(b) by 0 days.

(21) Appl. No.: 14/715,535

(22) Filed: May 18, 2015

(51) Int. Cl.
| | |
|---|---|
| *F03G 7/00* | (2006.01) |
| *F01K 25/06* | (2006.01) |
| *F03G 7/04* | (2006.01) |
| *F01K 23/02* | (2006.01) |
| *F01K 21/00* | (2006.01) |

(52) U.S. Cl.
CPC ............... *F03G 7/04* (2013.01); *F01K 21/005* (2013.01); *F01K 23/02* (2013.01); *F01K 25/06* (2013.01); *F01K 25/065* (2013.01); *Y02E 10/10* (2013.01)

(58) Field of Classification Search
CPC ......... F03G 7/04; F01K 25/065; F01K 25/06; F01K 21/005; F01K 23/02; Y02E 10/10
USPC ............ 60/641.2–641.4, 649, 651, 671, 673, 60/677–679
See application file for complete search history.

(56) References Cited

U.S. PATENT DOCUMENTS

| | | | | |
|---|---|---|---|---|
| 3,307,350 | A * | 3/1967 | Squires | 60/775 |
| 4,573,321 | A * | 3/1986 | Knaebel | 60/649 |
| 4,765,143 | A * | 8/1988 | Crawford et al. | 60/671 |
| 8,459,030 | B2 * | 6/2013 | Finkenrath et al. | 60/645 |
| 8,474,260 | B2 * | 7/2013 | Borissov et al. | 60/641.2 |
| 2011/0100002 | A1 | 5/2011 | Muir et al. | |
| 2013/0043678 | A1 | 2/2013 | Saar et al. | |
| 2013/0062890 | A1 | 3/2013 | Saar et al. | |
| 2014/0130498 | A1 | 5/2014 | Randolph et al. | |

FOREIGN PATENT DOCUMENTS

| | | |
|---|---|---|
| EP | 0 036 592 A1 | 9/1981 |
| WO | WO 2014/015307 A1 | 1/2014 |

OTHER PUBLICATIONS

"Store CO2 Underground and Extract Electricity? A Berkeley Lab-led Team is Working on It," Berkeley Lab website, Aug. 8, 2011.

* cited by examiner

*Primary Examiner* — Hoang Nguyen
(74) *Attorney, Agent, or Firm* — Richard C. Litman

(57) ABSTRACT

The geothermal energy generator system is a closed loop, binary cycle power generating plant that utilizes heat from a geothermal heat well to convert a working medium of gas, e.g., $CO_2$, and liquid, e.g., $H_2O$, into steam to produce energy. The geothermal energy generator system includes a medium preparation subsystem that cools recycled working medium to a predetermined temperature. The cooled working medium is selectively fed to a carbonation subsystem permitting the gas to dissolve into the liquid at the predetermined temperature. The carbonated working medium flows through a heat exchange pipe section in the geothermal heat well to produce high pressure steam and gas or hot medium. The hot medium passes through a power generating subsystem containing a primary power generating assembly, a secondary power generating assembly, and a tertiary power generating assembly arranged in series to maximize usage of heat from the working medium and produce energy.

19 Claims, 8 Drawing Sheets

| # GEOTHERMAL ENERGY GENERATOR SYSTEM

BACKGROUND OF THE INVENTION

1. Field of the Invention

The present invention relates to power generator systems, and particularly to a geothermal energy generator system that provides maximal conversion of geothermal heat into useable power with minimal environmental impact.

2. Description of the Related Art

The need for power in the form of, e.g. electricity, is ever increasing due to increasing demands. Limited natural resources and potential environmental harm limits meeting of these demands. These concerns provide the impetus for other areas of energy or power production.

One area of alternative power production deals with geothermal power plants. Most conventional geothermal plants generally employ heat from a heated medium, such as steam, hot water, $CO_2$ and other gases, of an underground, geothermal reservoir, to drive power generating turbines and/or provide additional heating for residences. While effective, these geothermal power plants tend to be inefficient. For example, many geothermal plants do not fully utilize the available potential energy of the hot medium. Use of the heated medium in these power plants, is generally not utilized for any other additional work. There is still much more work that can be obtained from the exiting medium.

In light of the above, there is still a need for a more efficient geothermal power plant that can more fully utilize the available heat for power production. Thus, a geothermal energy generator system solving the aforementioned problems is desired.

SUMMARY OF THE INVENTION

The geothermal energy generator system is a closed loop, binary cycle power generating plant that utilizes heat from a geothermal heat well to convert a working medium of gas, e.g., $CO_2$, and liquid, e.g., $H_2O$, into steam to produce energy. The geothermal energy generator system includes a medium preparation subsystem that cools recycled working medium to a predetermined temperature. The cooled working medium is selectively fed to a carbonation subsystem that permits gas to dissolve into the liquid at the predetermined temperature. The carbonated working medium flows through a heat exchange pipe section in the geothermal heat well to produce high pressure steam and gas or hot medium. The hot medium passes through a power generating subsystem containing a primary power generating assembly, a secondary power generating assembly, and a tertiary power generating assembly arranged in series to maximize usage of heat from the working medium and produce energy.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The geothermal energy generator system, generally referred to by the reference number 10 in the Figures, provides efficient energy production by maximizing utilization of heat from a geothermal heat well. The geothermal energy generator system 10 includes several subsystems for preparing and circulating a medium through the geothermal energy generator system 10 and generating power or energy, such as electricity, for distribution. Unlike most conventional geothermal power plants, the geothermal energy generator system 10 does not utilize the existing hot medium in a geothermal reservoir. Instead, the geothermal energy generator system 10 uses the heat from the geothermal reservoir to heat an external working medium.

Figure 1:
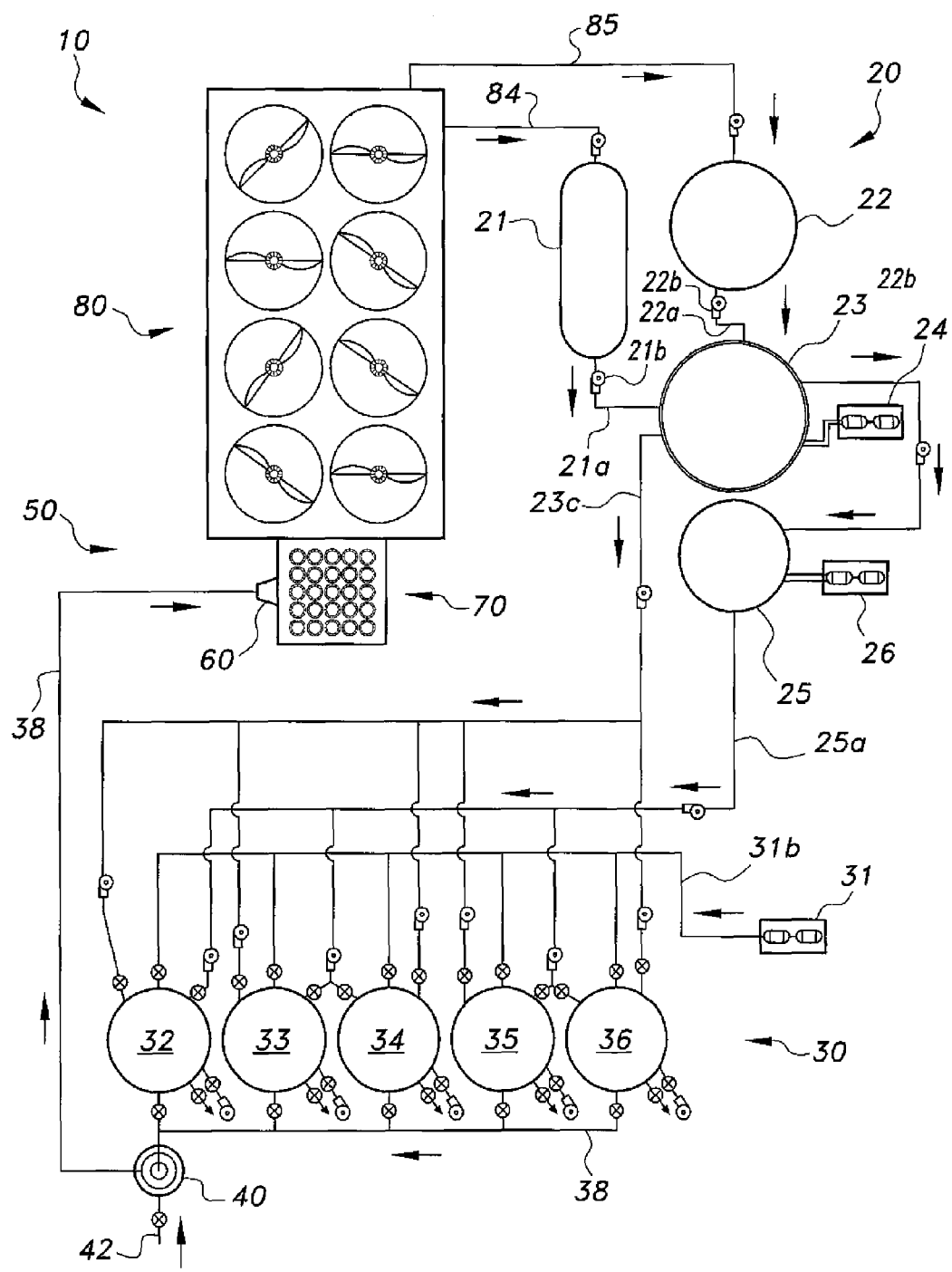
FIG. 1 is schematic diagram of a geothermal energy generator system according to the present invention.
Figure 2:
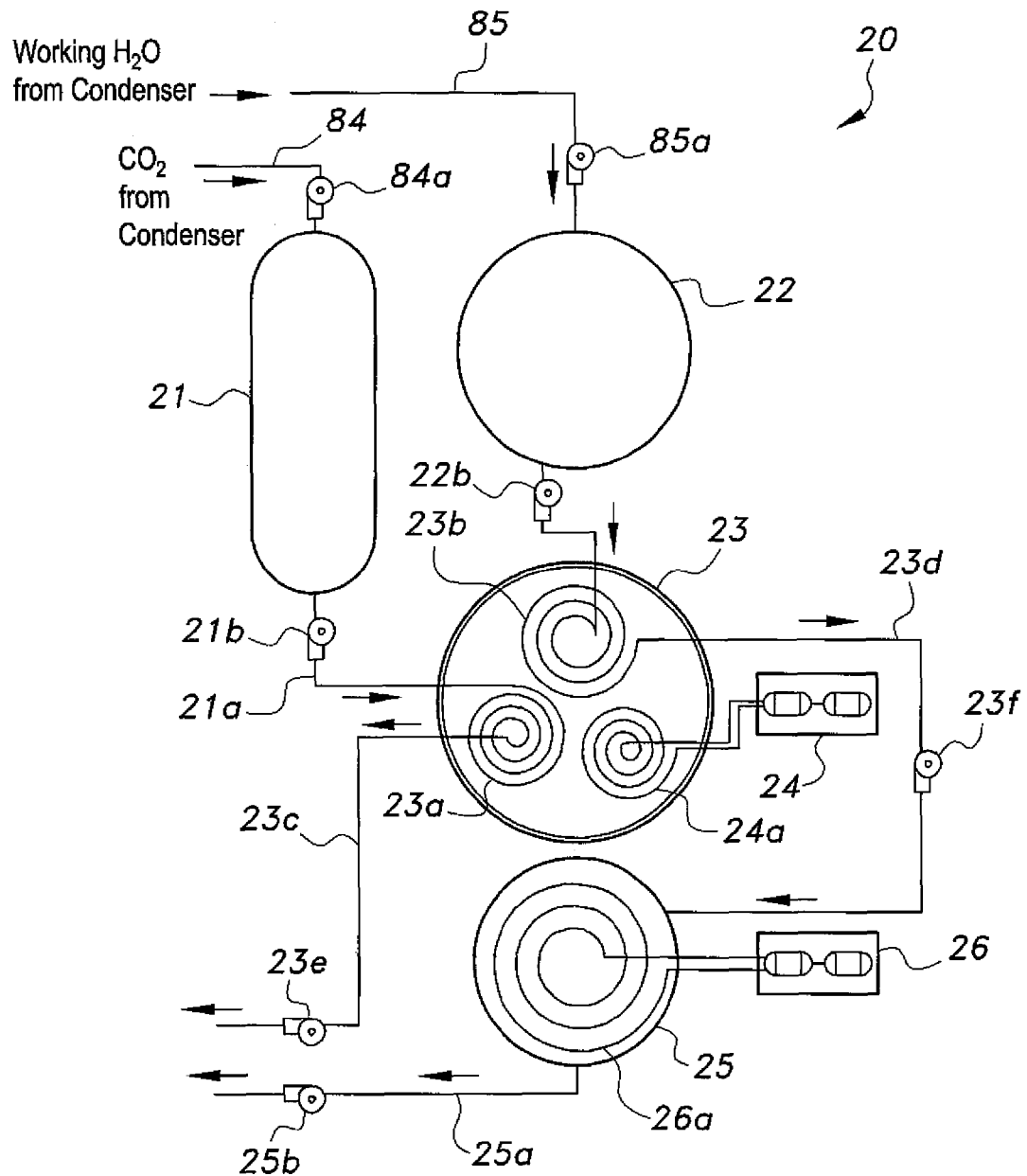
FIG. 2 is a detailed schematic diagram of a medium preparation section of the geothermal energy generator system shown in FIG. 1.

The geothermal energy generator system 10 is a type of binary cycle power plant configured in a closed loop to recycle the medium being processed for power production. As best seen in FIGS. 1 and 2, the geothermal energy generator system 10 includes a medium preparation subsystem 20. The medium preparation subsystem 20 recycles the medium exiting from a power generating subsystem 50 to cool and store the medium. In an embodiment, the medium is a solution of water ($H_2O$) and carbon dioxide ($CO_2$). This combination will flash steam at relatively low geothermal temperatures. Other gases and liquids with similar characteristics can also be used.

The medium preparation subsystem 20 includes a gas pre-cooling tank 21 and a liquid pre-cooling tank 22, in fluid communication with a corresponding gas outlet line 84 and liquid outlet line 85, respectively. The gas pre-cooling tank 21 receives and holds $CO_2$ until the $CO_2$ reaches ambient temperature. The liquid pre-cooling tank 22 similarly receives and holds $H_2O$ that has been condensed and distilled until the $H_2O$ also reaches ambient temperature. A feed gas outlet line 21a and a feed liquid outlet line 22a extends from the respective gas pre-cooling tank 21 and liquid pre-cooling tank 22 to selectively feed the contents of the tanks to a cooling bath tank 23. The selective feeding is facilitated by a pre-cooled gas feed pump 21b and a pre-cooled liquid feed pump 22b coupled to the respective feed outlet lines 21a, 22b.

The cooling bath tank 23 cools the $CO_2$ and the $H_2O$ down to a predetermined temperature prior to pumping the cold $CO_2$ and $H_2O$ to a carbonation subsystem 30. In an embodiment, the predetermined temperature is about 4° C. The cooling bath tank 23 contains water or water bath maintained at the predetermined temperature by a first refrigeration unit 24 coupled to the cooling bath tank 23. The cooling bath tank 23 can be insulated to preserve and maintain the temperature of the contents therein. A first refrigeration loop or coil 24a extends from the first refrigeration unit 24 into the cooling bath tank 23 to enable circulation of a refrigerant or coolant through the first refrigeration coil 24a. The circulating refrigerant cools the water and maintains the temperature at the predetermined level.

The pre-cooled $CO_2$ from the gas pre-cooling tank 21 flows through a gas cooling coil 23a immersed inside the cooling bath tank 23. Similarly, the pre-cooled $H_2O$ from the liquid pre-cooling tank 22 flows through a liquid cooling coil 23b immersed inside the cooling bath tank 23 (FIG. 2). Both the gas cooling coil 23a and the liquid cooling coil 23b enable cooling of the respective pre-cooled gas and liquid, e.g., $CO_2$ and $H_2O$, down to the predetermined temperature of the cold water inside the cooling bath tank 23 through heat exchange therewith. It is noted that the $H_2O$ being cooled and the cold water for cooling in the bath tank 24 are separate and different sources of water. As such, the $H_2O$ being introduced into the cooling bath tank 23 from the liquid pre-cooling tank 22 may also be referred as a "working $H_2O$," "working water," or "working liquid," which is a component of the working medium in the geothermal energy generator system 10, unless otherwise indicated.

A cold gas outlet line 23c extends from the gas cooling coil 23a and out of the cooling bath tank 23 to connect with the carbonation subsystem 30. A cold gas supply pump 23e is coupled to the cold gas outlet line 23c to facilitate selective feeding of the cold $CO_2$ to the carbonation subsystem 30.

The medium preparation subsystem 20 also includes a cold liquid outlet line 23d extending from the liquid cooling coil 23b and out of the cooling bath tank 23. A cold liquid supply pump 23f is coupled to the cold liquid outlet line 23d to selectively feed the cold $H_2O$ to a cold liquid storage tank 25. The cold liquid storage tank 25 collects and holds the cold $H_2O$ until needed by the carbonation subsystem 30. Some warming of the cold $H_2O$ can occur during idle periods of operation. To maintain the cold temperature, a second refrigeration unit 26 can be coupled to the cold liquid storage tank 25. A second refrigeration loop or coil 26a extends from the second refrigeration unit 26 into the cold liquid storage tank 25 to enable circulation of a refrigerant or coolant through the second refrigeration coil 26a. The circulating refrigerant maintains the cold temperature of the working $H_2O$. A working liquid outlet line 25a extends from the cold liquid storage tank 25, and the working liquid outlet line 25a is provided with a working liquid pump 25b to selectively feed the cold $H_2O$ from the cold liquid storage tank 25 to the carbonation subsystem 30.

Figure 3:
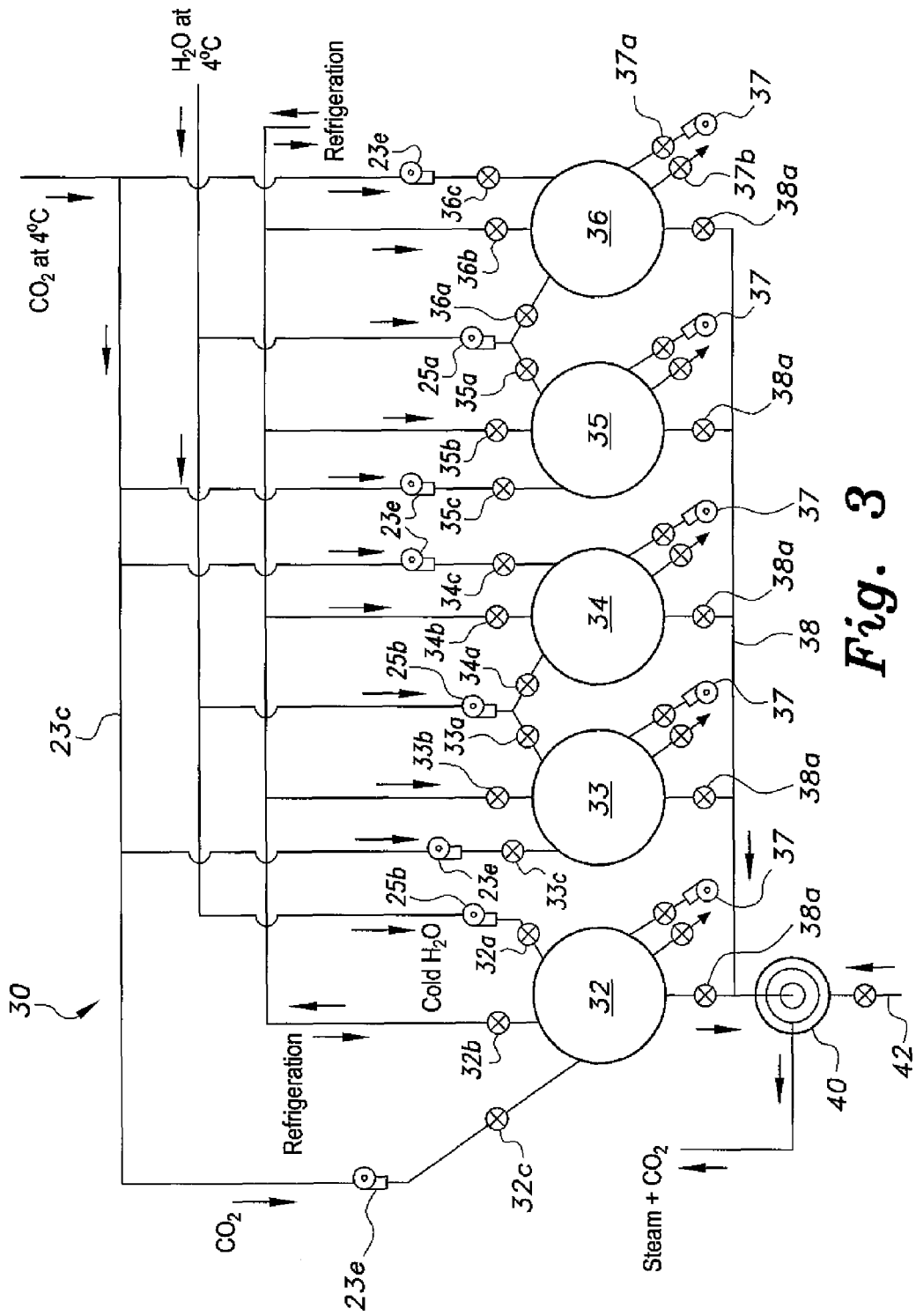
FIG. 3 is a detailed schematic diagram of a medium conversion section of the geothermal energy generator system shown in FIG. 1.
Figure 4:
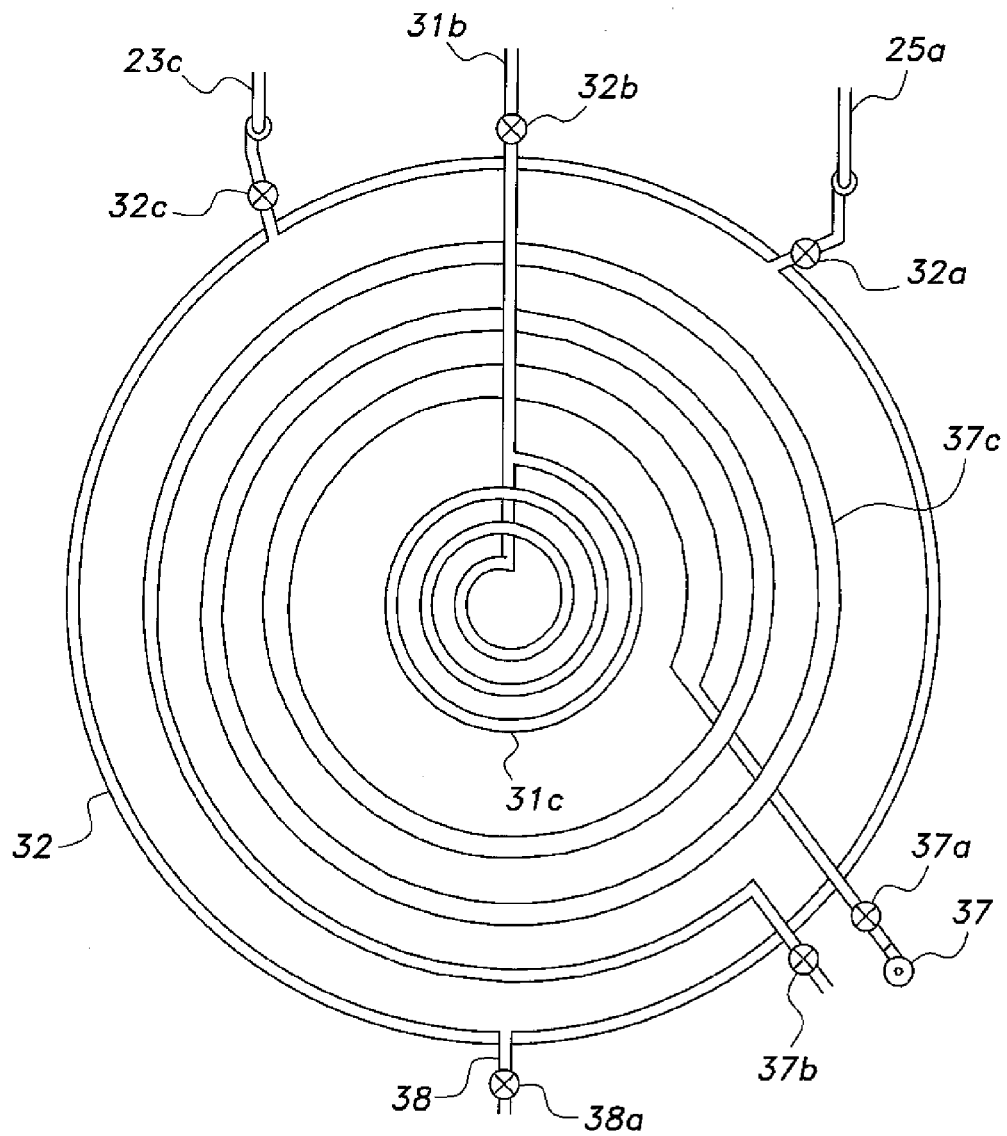
FIG. 4 is a detailed schematic diagram of one of the spherical containers in the medium conversion section shown in FIG. 3.

As best seen in FIGS. 1, 3, and 4, the carbonation subsystem 30 includes one or more spherical carbonation tanks 32, 33, 34, 35, 36 where the cold $H_2O$ and cold $CO_2$ accumulate to enable the cold $CO_2$ to dissolve into the cold $H_2O$ until a desired level of saturation has been reached, preferably full saturation. The resultant carbonated solution is the working medium, and the carbonated solution exhibits suitable volatility to rapidly form steam, i.e., flash steam, when exposed to high heat. Each carbonation tank 32, 33, 34, 35, 36 is preferably spherical in shape so as to provide a durable structure for withstanding and containing the internal pressure loads experienced during the carbonation process and dispensing of the working medium. It is contemplated that other shaped tanks can be used, such as elongate oblong-shaped tanks and cylindrical tanks. However, the sphere can provide a more even distribution of pressures which reduces probability of structural failure stresses over the long term.

Each carbonation tank 32, 33, 34, 35, 36 is coupled to or in fluid communication with the cold gas outlet line 23c and the working liquid outlet line 25a to enable selective feeding of the cold $CO_2$ and the cold $H_2O$ into the respective carbonation tank 32, 33, 34, 35, 36. The carbonation subsystem 30 also includes a third refrigeration unit 31 in fluid communication with each carbonation tank 32, 33, 34, 35, 36 via a refrigeration line 31b extending from the third refrigeration unit 31 and terminating in a third refrigeration coil 31c in each carbonation tank 32, 33, 34, 35, 36. The third refrigeration unit 31 facilitates selective cooling of the respective carbonation tank 32, 33, 34, 35, 36 in their cycle of operation.

Each carbonation tank 32, 33, 34, 35, 36 undergoes a multiphase cycle in producing the carbonated working medium. In an embodiment, the operational cycle is divided into five phases, stages, or steps, and the following description is directed toward the operation of the carbonation tank 32 for brevity and clarity. It is to be understood that all the carbonation tanks 32, 33, 34, 35, 36 operate in a similar fashion, and the features specific to each has been distinguished by corresponding alphanumeric reference numbers in the Figures.

As best seen in FIG. 4, the initial or first phase of the operating cycle for the carbonation tank 32 begins with cooling of the carbonation tank 32. Various valves such as a working liquid valve 32a, a cold gas valve 32c, and a cooling valve 32b are coupled to the respective working liquid outlet line 25a, cold gas outlet line 23c, and refrigeration line 31b to regulate flow of the media contained in the lines into the carbonation tank 32. Each carbonation tank 32 also includes a working medium outlet line 38 with a working medium valve 38a to regulate outflow of the carbonated water to a geothermal heat well 40. During this cooling phase, the cooling valve 32b is open while the cold gas valve 32c, working liquid valve 32a, and the working medium valve 38a are closed. Opening of the cooling valve 32b allows refrigerant or coolant to circulate through the third refrigeration coil 31e and cool the interior of the carbonation tank 32 down to a predetermined temperature, the predetermined temperature being preferably about 4° C.

The second phase of the cycle requires filling of the carbonation tank 32 with cold $H_2O$. The second phase begins when the carbonation tank 32 reaches the predetermined temperature. At this point, the working liquid valve 32a is opened and the working liquid pump 25b pumps the cold $H_2O$ into the carbonation tank 32 till full. The cooling valve 32b can remain open or closed to assist in maintaining the predetermined temperature. The working medium valve 38a remains closed during this time.

The third phase of the cycle introduces $CO_2$ into the filled tank to enable carbonation. When the carbonation tank 32 has been filled with the working water, the working liquid valve 32a is closed and the cold gas valve 32c is opened. The cold gas supply pump 23e pumps cold $CO_2$ into the carbonation tank 32 to dissolve the $CO_2$ into the working water. The cold gas supply pump 23e continues to pump $CO_2$ until the working water is fully saturated resulting in a highly carbonated solution. The cooling valve 32b can remain open or closed to assist in maintaining the predetermined temperature. Colder temperature assists in increasing, thus maximizing, the capacity of $CO_2$ that can be dissolved in the water. The working medium valve 38a remains closed during this time.

The fourth phase of the cycle transfers the carbonated working medium to the geothermal heat well 40. When the working water is fully saturated with $CO_2$, the cold gas valve 32c is closed sealing the carbonation tank 32. The cooling valve 32b is also closed. The only outlet for the working medium at this point is the working medium outlet line 38. During the actual carbonation occurring in the third phase, the internal pressure of the carbonation tank 32 increases to greater than 1 atm. This pressure provides the motive force for expelling the working medium as the working medium outlet valve 38a gradually opens relieving the internal pressure and releasing the working medium through the working medium outlet line 38. When the working medium flows through the geothermal heat well 40, exposure to heat and heat exchange therein causes rapid evaporation of the $H_2O$ and releases the $CO_2$, creating a mixture of high pressure steam and rapidly expanding volume of $CO_2$. The flow path of the working medium is confined so that the mixture of steam and $CO_2$ exhausts through a main turbine 60 in the power generating subsystem 50, which will be further detailed herein. This rapid formation of steam and gas may create some back pressure. However, the confined flow path between the carbonation tank 32 and the main turbine 60 insures that such back pressure and heat can be utilized to assist in draining the contents of the carbonation tank 32. Some heating of the carbonation tank 32 can occur during this draining or transferring step. The working medium valve 38a remains open until the internal pressure of the carbonation tank 32 has normalized to about 1 atm.

The fifth phase of the cycle prepares the carbonation tank 32 for the next batch of cold $H_2O$ and cold $CO_2$. Each carbonation tank 32, 33, 34, 35, 36 is provided with an air blower 37. An air cooling loop or coil 37c resides inside the respective carbonation tank 32, 33, 34, 35, 36 with an inlet end coupled to the air blower 37 and an outlet end extending outside the respective tank. The inlet end of the air cooling coil 37c includes an air inlet valve 37a, and the outlet end of the air cooling coil 37c includes an air outlet valve 37b. During this fifth phase of the cycle, the working medium valve 38a is closed when the internal pressure of the carbonation tank 32 reaches to about 1 atm. Both the air inlet valve 37a and the air outlet valve 37b are opened, and the air blower 37 is activated to blow cool outside or ambient air through the air cooling coil 37c. The circulating ambient air cools the interior of the carbonation tank 32 to ambient temperature. When ambient temperature has been reached, the air inlet valve 37a and the air outlet valve 37b are closed, the air blower 37 deactivated, and the cooling valve 32b is opened to repeat the multiphase cycle.

As noted previously, each carbonation tank 32, 33, 34, 35, 36 undergoes the same multiphase cycle. They do not, however, necessarily perform the cycle of operation at the same time. Since each carbonation tank 32, 33, 34, 35, 36 has a generally fixed capacity, it is preferable that one or more of the carbonation tanks 32, 33, 34, 35, 36 operate in a staggered pattern or out of phase with respect to each other to avoid potentially extended downtime in power production. For example, if all the carbonation tanks 32, 33, 34, 35, 36 were operating in sync and at the same phase, then there will be a lull in available working medium being fed to the power generating subsystem 50 due to empty carbonation tanks 32 requiring refill and carbonation. An asynchronous pattern of operation will ensure that a substantially continuous supply of working medium flows through the power generating subsystem 50. For example, while the carbonation tank 32 is at the first phase of the cycle, the carbonation tank 33 can be operating at the second phase of the cycle, the carbonation tank 34 can be operating at the third phase of the cycle, the carbonation tank 35 can be operating at the fourth phase of the cycle, and the carbonation tank 36 can be operating at the fifth stage of the cycle. The pattern can be varied, e.g., subsets of two, three, four tanks, etc., so long as the carbonation tanks 32, 33, 34, 35, 36 can be made to provide a substantially continuous supply of working medium.

Figure 5:
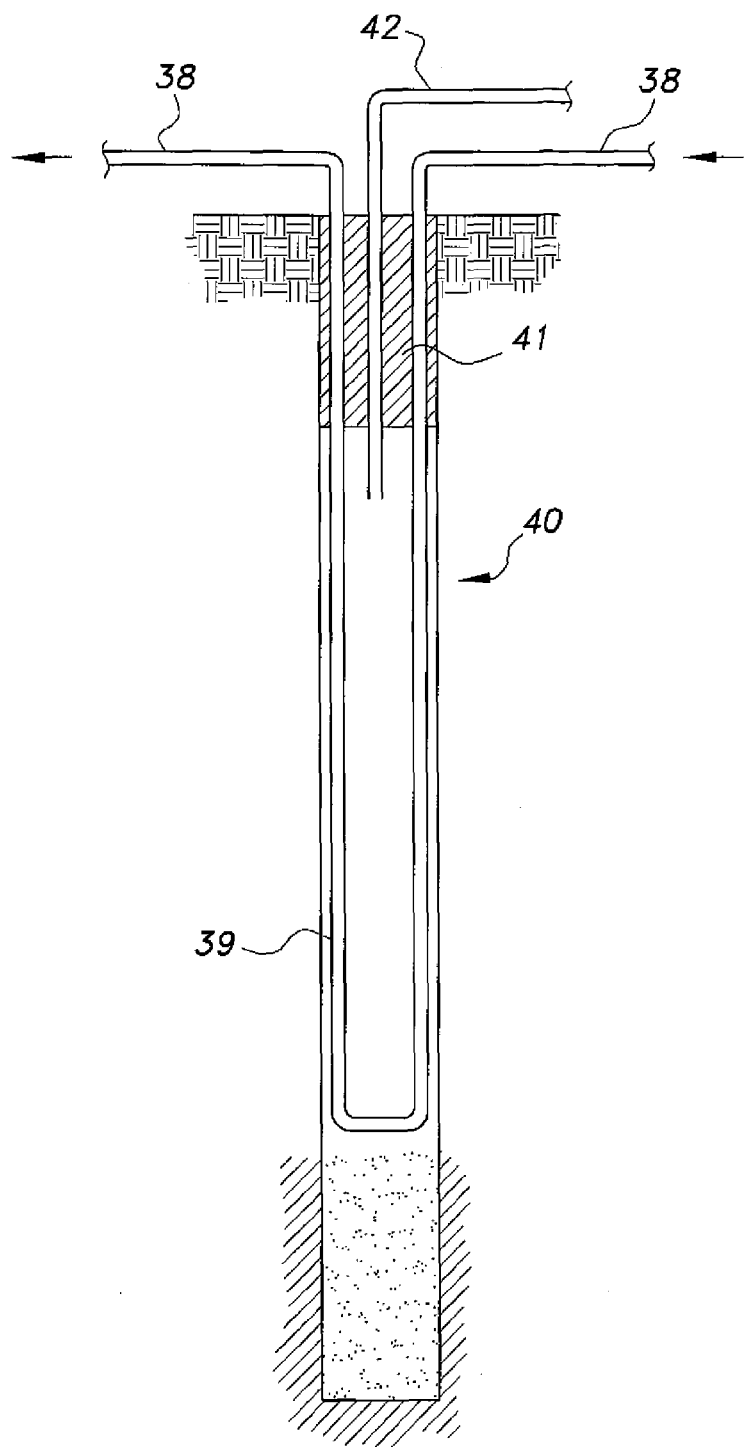
FIG. 5 is a sectional view of a geothermal heat well in the geothermal energy generator system shown in FIG. 1.

As best seen in FIG. 5, the working medium outlet line 38 extends into the geothermal heat well 40. The geothermal heat well 40 can be a drilled, earthen hole extending into the earth to a suitable depth that provides a stable temperature range of about 150° C. to 400° C. Most geothermal reservoirs contain natural steam, which is the working medium utilized by some conventional geothermal power plants. The geothermal energy generator system 10, however, only utilizes the heat from the geothermal heat well 40 to generate steam. To that end, the working medium outlet line 38 includes a heat exchange section 39 that allows heat transfer between the working medium flowing through the working medium outlet line 38 and the heat inside the geothermal heat well 40. Thus, the working medium for the geothermal energy generator system 10 is isolated from the steam that may naturally exist in the geothermal heat well 40. The geothermal heat well 40 is provided with a concrete plug 41 capping the geothermal heat well 40, which traps the heat and other contents thereof. The geothermal heat well 40 can also be provided with an auxiliary water supply line 42 extending into the geothermal heat well 40 through the plug 41 to selectively feed water into the well if the water content in the well is dry or depleted to undesirable levels. It can be seen from this configuration that the geothermal heat well 40 has negligible impact on the natural environment, and no natural resources, apart from the heat, is consumed in the process of generating energy.

The working medium outlet line 38 is in fluid communication with the main turbine 60 of the power generating subsystem 50. The working medium outlet line 38 discharges the high pressure steam and $CO_2$ to the main turbine 60 and drives the same. As mentioned previously, the flow path between carbonation tanks 32, 33, 34, 35, 36 and the main turbine 60 is confined in that the only outlet for the working medium is exiting through the main turbine 60. None of the working medium is redirected, and the spherical shape of the carbonation tanks 32, 33, 34, 35, 36 is well suited to endure the fluctuations of pressure and temperature as a result of this configuration.

The power generating subsystem 50 is configured to maximize energy or power production from the available heat in the hot working medium. Instead of one means of power production, the power generating subsystem 50 includes several power-generating means arranged in series. As such, the main turbine 60 can also be referred to as a primary power generator assembly. The main turbine 60 generally produces most of the power in the geothermal energy generator system 10.

Figure 6:
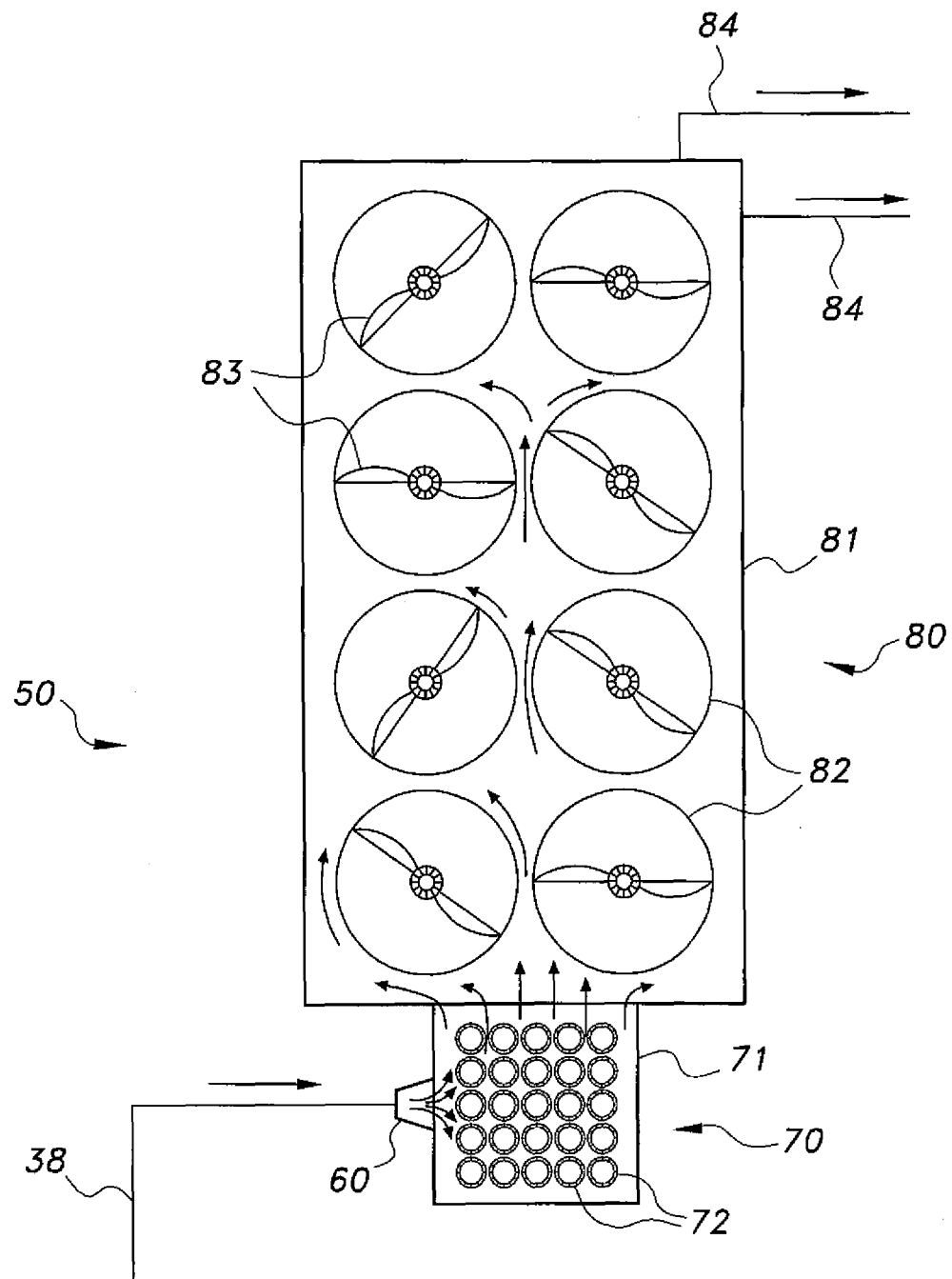
FIG. 6 is a detailed schematic diagram of a power generating section of the geothermal energy generator system shown in FIG. 1, as seen from the top.
Figure 7:
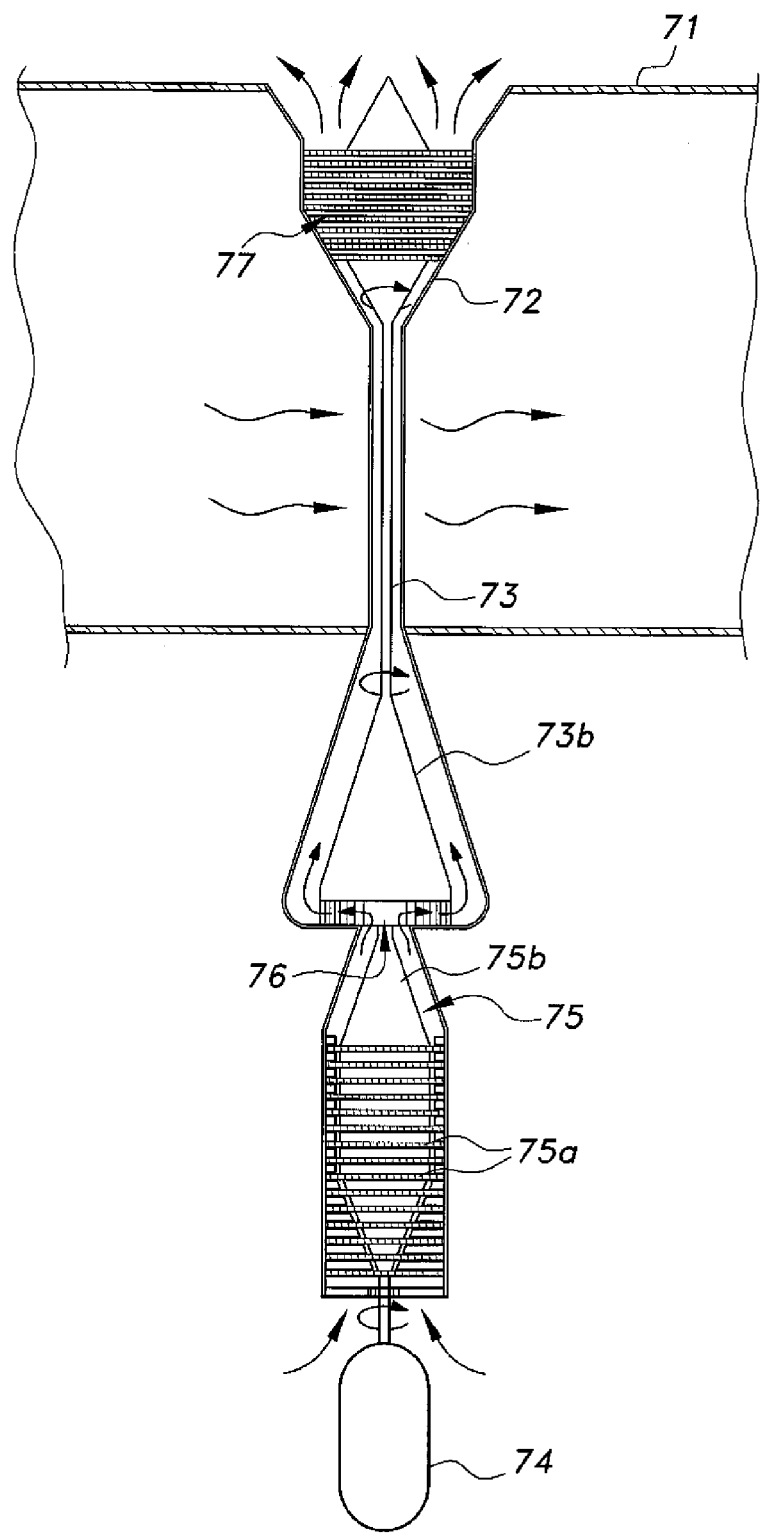
FIG. 7 is a sectional view of one of the vertical columns in a secondary chamber of the power generating section shown in FIG. 6.
Figure 8:
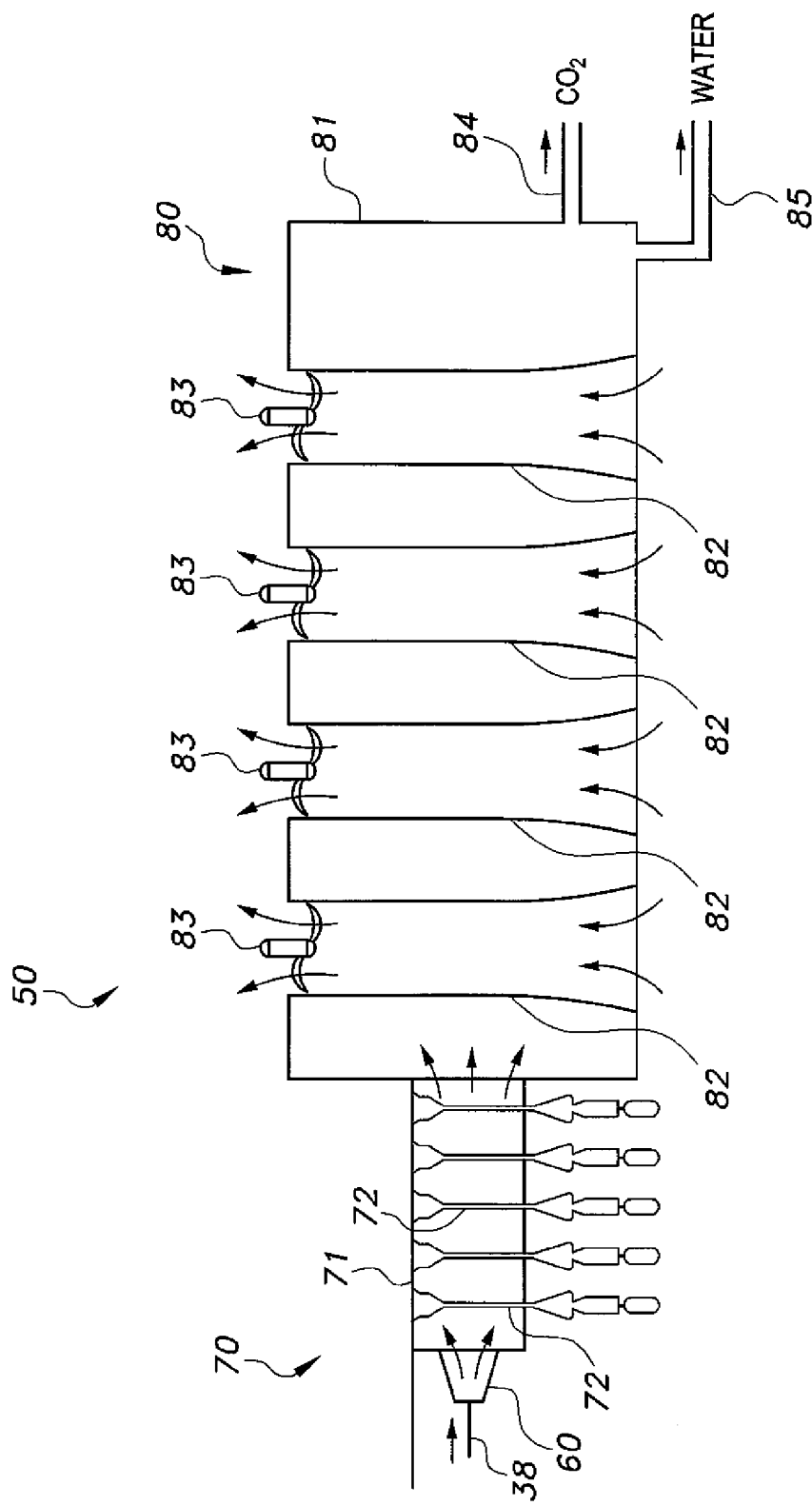
FIG. 8 is a detailed schematic diagram of the power generating section of the geothermal energy generator system shown in FIG. 1, as seen from the side.

As best seen in FIGS. 6-8, the power generating subsystem 50 includes a secondary power generator assembly 70 downstream of the main turbine 60. The secondary power generator assembly 70 includes a relatively large first housing or chamber 71 containing a plurality of elongate, vertical secondary power generating columns 72 (FIG. 7). Each secondary power generating column 72 has a generally hourglass shape with the top end, at the ceiling, open or exposed to outside the first chamber 71 and the bottom end closed and extending through the floor of the first chamber 71.

Each secondary power generating column 72 houses a rotating common drive shaft 73 axially mounted inside the corresponding secondary power generating column 72. From the bottom as shown in the side view of FIG. 7, each secondary power generating column 72 includes a generator 74 coaxially mounted to the common drive shaft 73, a compressor 75 disposed above the generator on the common drive shaft 73, a diffuser 76 rotatably mounted to the common drive shaft 73 above the compressor 75, and a secondary turbine 77 mounted to the common drive shaft 77 near the top of the secondary power generating column 72.

Each secondary power generating column 72 generates additional power by employing the residual heat from the working medium exiting the main turbine 60 to heat and agitate air flowing through column 72. The exiting working medium from the main turbine 60 still contains an abundance of residual heat, which in most conventional systems, would be wasted or diverted to heat residential areas. In the geothermal energy generator system 10, the residual heat and the abundant potential energy thereof is exploited to obtain more work.

The generator 74, the compressor 75, and the diffuser 76 sections of the secondary power generating column 72 is preferably disposed underground or beneath the first chamber 71 so as to isolate these sections from heat exposure. Moreover, this area is cooler than an interior of the first chamber 71. The compressor 75 includes a plurality of rotating and/or fixed fans 75*a* mounted to a taper-ended section 75*b* of the common drive shaft 73. The compressor 75 draws relative cool air from the surroundings, i.e. cooler zone, or from a separate source and forces the air to flow around the taper-ended section 75*b* to compact and pressurize the air. This imparts increased airflow velocity to the air exiting the compressor 75.

The diffuser 76 circulates the air around a generally lower conical section 73*b* of the common drive shaft 73 to permit the air to flow upward towards the secondary turbine 77. The portion of the secondary power generating column 72 that extends between the floor and the ceiling of the first chamber 71 is exposed to heat from the working medium passing through the first chamber 71. Heat transfer between the relatively hot working medium and the air inside the secondary power generating column 72 heats the inside air. The heat expands the air which imparts increased convection current thereto forcing the air to rise towards and through the secondary turbine 77 and to drive the secondary turbine 77. Since all of the components are mounted to the common drive shaft 73, rotation of the secondary turbine 77 also rotates the diffuser 76, the compressor 75, and drives the generator 74 to produce additional power or energy.

It is to be noted that the arrangement of the plurality of secondary power generating columns 72 is not limited to the regular rows shown in the Figures. The arrangement of the secondary power generating columns 72 can vary such as irregular rows, staggered rows, non-uniform patterns, and the like to maximize heat exposure from the hot working medium flowing through the first chamber 71.

As best seen in FIGS. 6 and 8, the power generating subsystem 50 also includes a tertiary power generator assembly 80 downstream of the secondary power generator assembly 70. The tertiary power generator assembly 80 includes a relatively large second housing or chamber 81 containing a plurality of elongate, vertical tertiary power generating columns 82. The second chamber 81 is preferably larger than the first chamber 71 mainly due to the relatively large tertiary power generating columns 82 and larger volume of air being processed thereby.

Each tertiary power generating column 82 extends between the floor and ceiling of the second chamber 81 with opposite open ends exposed to an area outside of the chamber 81. A wind turbine 83 is mounted to the top or top end of each tertiary power generating column 82. In use, the open bottom end permits ambient air to flow upward through the corresponding tertiary power generating column 82, while the working medium from the first chamber 71 flows around the tertiary power generating columns 82 to heat the air inside the second chamber 81. The heating of the inside air induces convection, and the resultant increased velocity and airflow drives the corresponding wind turbine 83 to produce additional power or energy as the air flows through the open upper end of each tertiary power generating column 82.

Each tertiary power generating column 82 is preferably tapered or frustoconical in shape to maximize airflow through each tertiary power generating column 82. The relatively larger base and the relatively narrower top funnel the air flowing from the bottom, which produces a relatively higher exit velocity of the air and, thereby, maximizes rotation of the wind turbine 83. It is also contemplated that tertiary power generating columns 82 can be constructed as straight cylinders. However, the subsequent exit velocity of the air may be less than that which can be achieved with a tapered shape. As with the secondary power generating columns 72, the tertiary power generating columns 82 can be arranged in any desired manner apart from that shown in the Figures.

After the working medium flows around the tertiary power generating columns 82 and accumulates in the second chamber 81, the $CO_2$ and the $H_2O$ components in the working medium pass through condensers (not shown) to be recycled back to the medium preparation subsystem 20. The second chamber 81 includes the gas outlet line 84 and the liquid outlet line 85 to pass the respective $CO_2$ and $H_2O$ back to the gas pre-cooling tank 21 and the liquid pre-cooling tank 22 to repeat the operational closed loop circuit of the working medium. A gas feed pump 84*a* and a liquid feed pump 85*a* can be coupled to the respective lines 84, 85 to facilitate positive feeding of the components to the tanks 21, 22.

The secondary power generating columns 72 take full advantage of the available heat from the working medium exiting the main turbine 60. As the working medium flows from the working medium outlet line 38 through each power generating means, there will be heat loss and cooling of the working medium at each stage of power production, with maximum available heat at the main turbine 60 and relatively minimal available heat at the second chamber 81. However, with respect to the auxiliary power generation provided by the secondary power generator assembly 70 and the tertiary power generator assembly 80, the relatively hotter working medium in the first chamber 71 provides suitable heat energy and heat transfer to the air inside the secondary power generating columns 72 to move the internal components therein.

As a relatively larger volume of air moves inside each tertiary power generating column 82, there is not as much heat required to induce movement therein. Moreover, the wind turbines 83 do not require much wind velocity to move the blades, since most wind turbines are very efficient with respect to required wind velocities for operation.

Thus, it can be seen that the geothermal energy generator system 10 extracts as much work out of the hot working medium as possible to generate power. Depending on the available heat, some may be siphoned and distributed to heat residences. Since the geothermal energy generator system 10 only utilizes the heat from the geothermal heat well 40, this minimizes any concerns of depleting natural working medium from most conventional geothermal reservoirs over long term operation. Moreover, the closed loop and binary cycle type of operation allows for usage of relatively moderate range of geothermal heat. This eliminates some of the substantial economic investment necessary for drilling very deep into the earth. The working medium is recycled which also reduces resource costs and impact on the environment.

It is to be understood that the geothermal energy generator system 10 encompasses a variety of alternatives. For example, the operation of the various pumps and valves can be performed manually and/or automatically. The various tanks mentioned can be insulated to maintain cool temperatures. The secondary power generating columns 72 and the tertiary power generating columns 82 are preferably constructed from thermally conductive materials such as concrete, metals, composites and the like to maximize heat transfer between the working medium and the air. Moreover, the working medium can be replenished from an outside source or from a geothermal reservoir.

It is to be understood that the present invention is not limited to the embodiments described above, but encompasses any and all embodiments within the scope of the following claims.

I claim:

1. A geothermal energy generator system, comprising:
   a medium preparation subsystem to cool components of a working medium to a predetermined temperature, the components being at least one gas and at least one liquid;
   a carbonation subsystem in fluid communication with the medium preparation subsystem, the carbonation subsystem having at least one carbonation tank, the medium preparation subsystem selectively supplying the carbonation tank with the at least one liquid and the at least one gas to dissolve the at least one gas into the at least one liquid, the at least one carbonation tank having a working medium outlet line;
   a geothermal heat well coupled to the working medium outlet line, the working medium outlet line having a heat exchange section extending into and out of the geothermal heat well to convert the working medium into hot working medium; and
   a power generating subsystem coupled to the working medium outlet line downstream of the geothermal heat well, the power generating subsystem having a plurality of different power generating assemblies arranged in series, each power generating assembly utilizing heat from the hot working medium flowing through the power generating assemblies to produce energy, one of the power generating assemblies having a gas outlet line and a liquid outlet line coupled to the medium preparation subsystem to recycle the working medium and form a closed loop operation of the working medium.

2. The geothermal energy generator system according to claim 1, wherein said medium preparation subsystem comprises:
   a gas pre-cooling tank coupled to said gas outlet line, said gas pre-cooling tank holding said at least one gas from said gas outlet line and cooling said at least one gas to ambient temperature, said gas pre-cooling tank having a feed gas outlet line;
   a liquid pre-cooling tank coupled to said liquid outlet line, said liquid pre-cooling tank holding said at least one liquid from said liquid outlet line and cooling said at least one liquid to ambient temperature, said liquid pre-cooling tank having a feed liquid outlet line;
   a cooling bath tank coupled to said feed gas outlet line and said feed liquid outlet line, said cooling bath tank having a water bath therein to cool said at least one gas and said at least one liquid circulating inside said cooling bath tank down to said predetermined temperature;
   a first refrigeration unit coupled to said cooling bath tank, said first refrigeration unit cooling and maintaining said water bath at said predetermined temperature;
   a cold gas outlet line extending out of said cooling bath tank, said cold gas outlet line in fluid communication with said carbonation subsystem to selectively feed cold said at least one gas to said at least one carbonation tank;
   a cold liquid outlet line extending out of said cooling bath tank;
   a cold liquid storage tank coupled to said cold liquid outlet line, said cold liquid storage tank holding said at least one liquid at said predetermined temperature, said cold liquid storage tank having a working liquid outlet line in fluid communication with said carbonation subsystem to selectively feed cold said at least one liquid to said at least one carbonation tank; and
   a second refrigeration unit coupled to said cold liquid storage tank, said second refrigeration unit cooling and maintaining said at least one liquid in said cold liquid storage tank at said predetermined temperature.

3. The geothermal energy generator system according to claim 2, further comprising a pump coupled to said feed liquid outlet line, said cold gas outlet line, said cold liquid outlet line, and said working liquid outlet line to selectively pump contents of said respective tanks.

4. The geothermal energy generator system according to claim 2, wherein said cooling water bath tank comprises:
   a gas cooling coil connected to said feed gas outlet line and said cold gas outlet line, said gas cooling coil being disposed inside said cooling bath tank, said gas cooling coil facilitating circulation of said at least one gas to be cooled by said water bath; and
   a liquid cooling coil connected to said feed liquid outlet line and said cold liquid outlet line, said liquid cooling coil being disposed inside said cooling bath tank adjacent said gas cooling coil, said liquid cooling coil facilitating circulation of said at least one liquid to be cooled by said water bath.

5. The geothermal energy generator system according to claim 2, wherein said first refrigeration unit comprises a first refrigeration coil extending into said cooling bath tank, said first refrigeration coil facilitating circulation of a coolant to cool and maintain said water bath at said predetermined temperature.

6. The geothermal energy generator system according to claim 2, wherein said second refrigeration unit comprises a second refrigeration coil extending into said cold liquid storage tank, said second refrigeration coil facilitating circulation of a coolant to cool and maintain said at least one liquid at said predetermined temperature.

7. The geothermal energy generator system according to claim 1, wherein said carbonation subsystem comprises:
   said at least one carbonation tank;
   a third refrigeration unit in fluid communication with said at least one carbonation tank, said third refrigeration unit selectively cooling and maintaining content inside said at least one carbonation tank at said predetermined temperature;
   an air blower coupled to each said at least one carbonation tank, said air blower selectively cooling said at least one carbonation tank down to ambient temperature by circulating ambient air inside said at least one carbonation tank; and
   a plurality of valves coupled to each said at least one carbonation tank, said plurality of valves regulating flow of media into and out of said at least one carbonation tank.

8. The geothermal energy generator system according to claim 7, wherein said plurality of valves comprises:
   a cooling valve coupled to said third refrigeration unit, said cooling valve selectively operable to circulate coolant and cool said at least one carbonation tank down to said predetermined temperature;

a working liquid valve coupled to a working liquid outlet line from said medium preparation subsystem, said working liquid valve selectively operable to feed cold said at least one liquid into said at least one carbonation tank until full;

a cold gas valve coupled to a cold gas outlet line from said medium preparation subsystem, said cold gas valve selectively operable to feed cold said at least one gas into said at least one carbonation tank to dissolve said at least one gas into said at least one liquid until full saturation and form a carbonated working medium;

a working medium valve coupled to said working medium outlet line, said working medium valve selectively operable to discharge said carbonated working medium to said geothermal heat well; and an air inlet valve coupled to said air blower and an air outlet valve in fluid communication with outside, said air inlet valve and said air outlet valve selectively operable to circulate air through said at least one carbonation tank to cool said at least one carbonation tank down to ambient temperature.

9. The geothermal energy generator system according to claim 8, wherein each said at least one carbonation tank comprises:

a third refrigeration coil disposed inside said at least one carbonation tank, said third refrigeration coil being coupled to said cooling valve, selective operation of said cooling valve facilitating circulation of a coolant through said third refrigeration coil; and an air cooling coil disposed inside said at least one carbonation tank adjacent said third refrigeration coil, one end of said air cooling coil being coupled to said air inlet valve and an opposite end of said air cooling coil being coupled to said air outlet valve, selective operation of said air inlet valve and said air outlet valve facilitating circulation of ambient air through said air cooling coil.

10. The geothermal energy generator system according to claim 7, wherein said at least one carbonation tank comprises a plurality of carbonation tanks.

11. The geothermal energy generator system according to claim 1, wherein said at least one gas and said at least one liquid comprises $CO_2$ and $H_2O$ respectively.

12. The geothermal energy generator system according to claim 1, wherein said predetermined temperature is about 4° C.

13. The geothermal energy generator system according to claim 1, wherein said geothermal heat well comprises:

an earthen hole having a depth that provides temperature in a range of about 150° C. to 400° C.;

a cap sealing said earthen hole, said working medium outlet line extending into said earthen hole through said cap and looping out of said earthen hole through said cap; and an auxiliary water supply line extending through said cap, said auxiliary water supply line permitting selectively feeding of water into said earthen hole to replenish water content when needed.

14. The geothermal energy generator system according to claim 1, wherein said plurality of different power generating assemblies comprises:

a primary power generator assembly, said primary power generator assembly being coupled to said working medium outlet line;

a secondary power generator assembly downstream of said primary power generator assembly, said secondary power generator assembly employing heat from said hot working medium exiting said primary power generator assembly and flowing through said secondary power generator assembly to produce additional energy; and a tertiary power generator assembly downstream of said secondary power generator assembly, said secondary power generator assembly employing heat from said hot working medium exiting said secondary power generator assembly and flowing through said tertiary power generator assembly to produce additional energy.

15. The geothermal energy generator system according to claim 14, wherein said primary power generator assembly comprises a main turbine.

16. The geothermal energy generator system according to claim 14, wherein said secondary power generator assembly comprises:

a first chamber having a ceiling and a floor; and a plurality of elongate, vertical secondary power generating columns disposed in said chamber, each secondary power generating column extending from below said floor to said ceiling to expose a portion of each said secondary power generating column to environment inside said first chamber, each secondary power generating column having;

an open, top and bottom ends;

a common drive shaft rotatably mounted axially in said secondary power generating column;

a generator coupled to a bottom end of said common drive shaft;

a compressor rotatably mounted to said common drive shaft above said generator, said compressor drawing and compressing ambient air to force airflow upwardly through said secondary power generating column;

a diffuser rotatably mounted to said common drive shaft above said compressor, said diffuser distributing compressed air from said compressor around said common drive shaft; and a secondary turbine mounted to a top end of said common drive shaft, said secondary turbine being driven by said airflow through said secondary power generating column;

wherein said hot medium flowing through said first chamber heats said air flowing through each said secondary power generating columns by heat transfer through said exposed portions, heated air induces convection which increases velocity of airflow to drive said secondary turbine and causes concurrent operation of said compressor, said diffuser, and said generator to produce energy.

17. The geothermal energy generator system according to claim 14, wherein said tertiary power generator assembly comprises:

a second chamber having a ceiling, a floor, said gas outlet line extending from said second chamber, and said liquid outlet line extending from said second chamber; and a plurality of elongate, vertical tertiary power generating columns disposed in said chamber, each secondary power generating column extending between said floor and said ceiling to expose each said secondary power generating column to environment inside said second chamber, each tertiary power generating column having;

tapered sidewalls extending from said floor;

an open, top and bottom ends, said open bottom end permitting ambient air to flow from said bottom end towards said top end; and a wind turbine mounted to said top end;

wherein said hot medium flowing through said second chamber heats said air flowing through each said tertiary power generating columns by heat transfer through exposed areas of said tertiary power generating columns, heated air induces convection which increases velocity of airflow to drive said wind turbine and produce energy.

18. A method of producing energy from a geothermal source, comprising the steps of:
provide a medium preparation subsystem to cool components of a working medium to a predetermined temperature, the components being at least one gas and at least one liquid;
providing a carbonation subsystem in fluid communication with the medium preparation subsystem, the carbonation subsystem having at least one carbonation tank, the medium preparation subsystem selectively supplying the carbonation tank with the at least one liquid and the at least one gas to dissolve the at least one gas into the at least one liquid, the at least one carbonation tank having a working medium outlet line;
providing a geothermal heat well coupled to the working medium outlet line, the working medium outlet line having a heat exchange section extending into and out of the geothermal heat well to convert the working medium into hot working medium;
providing a power generating subsystem coupled to the working medium outlet line downstream of the geothermal heat well, the power generating subsystem having a plurality of different power generating assemblies arranged in series, each power generating assembly utilizing heat from the hot working medium flowing through the power generating assemblies to produce energy, one of the power generating assemblies having a gas outlet line and a liquid outlet line coupled to the medium preparation subsystem to recycle the working medium and form a closed loop operation of the working medium;
cooling the at least one gas and the at least one liquid by processing the recycled working medium through the medium preparation subsystem;
carbonating the working medium inside the at least one carbonation chamber;
discharging the working medium through the working medium outlet line;
producing high pressure steam and gas by passing the working medium through the heat exchange section of the working medium outlet line inside the geothermal heat well; and
passing the steam and gas through each power generating assembly to produce energy.

19. The method of producing energy from a geothermal source according to claim 18, wherein the step of carbonating the working medium inside the at least one carbonation chamber comprising the steps of:
providing each said at least one carbonation tank with a cooling valve to selectively introduce coolant into said at least one carbonation tank, a working liquid valve to selectively introduce cold said at least one liquid into said at least one carbonation tank, a cold gas valve to selectively introduce cold said at least one gas into said at least one carbonation tank, a working medium valve to selectively discharge carbonated medium to said geothermal heat well, and an air inlet valve and an air outlet valve to circulate ambient air through said at least one carbonation tank;
cooling said at least one carbonation tank to said predetermined temperature by opening said cooling valve while said cold gas valve, said working liquid valve, and said working medium valve are closed;
filling said at least one carbonation tank until full with cold said at least one liquid by opening said working liquid valve while said cold gas valve and said working medium valve remain closed;
feeding said at least one carbonation tank with cold said at least one gas by closing said working liquid valve and opening said cold gas valve while said cooling valve remains open and said working medium valve remains closed;
continuously feeding said cold at least one gas until full saturation has been reached to form said carbonated working medium;
discharging said carbonated working medium to said geothermal heat well by closing said cooling valve and said cold gas valve, then opening said working medium valve;
continuously feeding said carbonated working medium by keeping said working medium valve open until internal pressure inside said at least one carbonation chamber has reached about 1 atm;
cooling said at least one carbonation chamber down to ambient temperature by closing said working medium valve and opening both said air inlet valve and said air outlet valve to circulate ambient air through said at least one carbonation chamber.

* * * * *